(12) United States Patent
Ji et al.

(10) Patent No.: US 12,356,104 B2
(45) Date of Patent: Jul. 8, 2025

(54) ACCELERATOR, STORAGE DEVICE, AND VR SYSTEM

(71) Applicant: Samsung Electronics Co., Ltd., Suwon-si (KR)

(72) Inventors: Sooyoung Ji, Suwon-si (KR); Minho Kim, Suwon-si (KR); Dongouk Moon, Suwon-si (KR); Sanghwa Jin, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 259 days.

(21) Appl. No.: 18/163,543

(22) Filed: Feb. 2, 2023

(65) Prior Publication Data

US 2024/0007586 A1 Jan. 4, 2024

(30) Foreign Application Priority Data

Jun. 29, 2022 (KR) .......................... 10-2022-0079786

(51) Int. Cl.
| | |
|---|---|
| *H04N 5/265* | (2006.01) |
| *G06T 1/20* | (2006.01) |
| *G06T 1/60* | (2006.01) |
| *G06T 7/13* | (2017.01) |
| *G06T 7/174* | (2017.01) |
| *G06T 11/00* | (2006.01) |

(52) U.S. Cl.
CPC ............... *H04N 5/265* (2013.01); *G06T 1/20* (2013.01); *G06T 1/60* (2013.01); *G06T 7/13* (2017.01); *G06T 7/174* (2017.01); *G06T 11/001* (2013.01); *G06T 2207/20212* (2013.01); *G06T 2210/52* (2013.01)

(58) Field of Classification Search
CPC .. H04N 5/265; G06T 1/20; G06T 1/60; G06T 7/13; G06T 7/174; G06T 11/001; G06T 2207/20212; G06T 2210/52; G06T 3/4038; G06T 7/90; G06T 19/006; G06T 5/50; G06T 7/11; G06T 19/003
See application file for complete search history.

(56) References Cited

U.S. PATENT DOCUMENTS 10,039,501 B2    8/2018    Park
10,445,882 B2    10/2019   Liao
(Continued)

FOREIGN PATENT DOCUMENTS

KR    20090108495 A    10/2009

*Primary Examiner* — Yogesh K Aggarwal
(74) *Attorney, Agent, or Firm* — Myers Bigel, P.A.

(57) ABSTRACT

An accelerator includes a memory access module configured to acquire a plurality of original images for generating a VR image from a input device, and a computing module including a stitching region detector, a stitching processor, an image processor, and a combination processor. The memory access module is configured to transmit the plurality of original images to the stitching region detector. The stitching region detector is configured to detect at least one stitching region and an image region from each of the plurality of original images by performing detection processing on each of the plurality of original images received from the memory access module, to provide the at least one stitching region to the stitching processor, and to provide the image region to the image processor. The stitching processor is configured to generate at least one post-processed stitching region.

19 Claims, 14 Drawing Sheets

(56) References Cited

U.S. PATENT DOCUMENTS

| | | |
|---|---|---|
| 11,049,218 B2 | 6/2021 | Khwaja et al. |
| 11,068,544 B2 | 7/2021 | Kudryavtsev et al. |
| 2018/0205889 A1* | 7/2018 | Abbas .................... H04N 23/90 |
| 2020/0311884 A1 | 10/2020 | Hong et al. |
| 2021/0390762 A1 | 12/2021 | Sakthivel et al. |

* cited by examiner

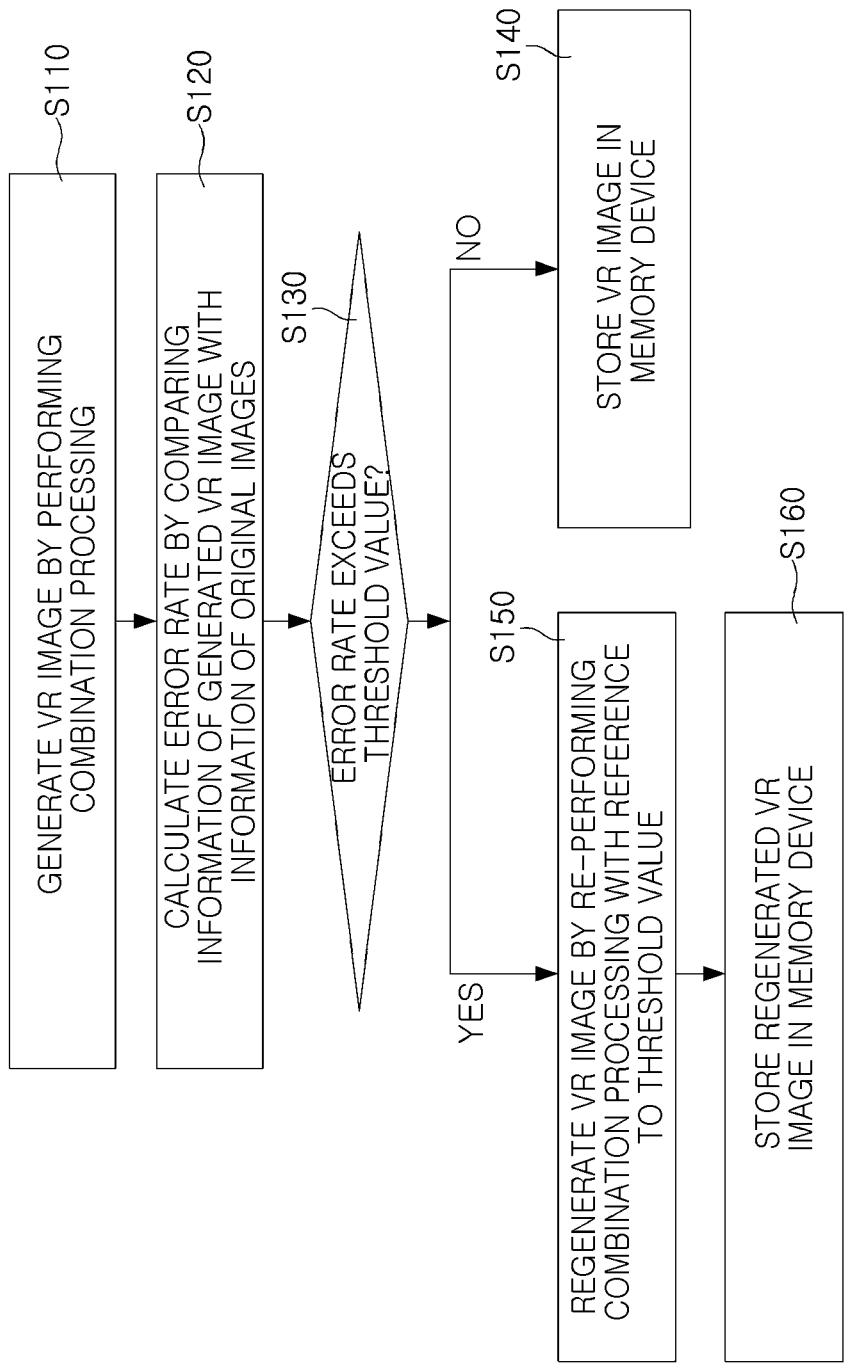

ACCELERATOR, STORAGE DEVICE, AND VR SYSTEM

CROSS-REFERENCE TO RELATED APPLICATION(S)

This application claims benefit of priority to Korean Patent Application No. 10-2022-0079786 filed on Jun. 29, 2022 in the Korean Intellectual Property Office, the disclosure of which is incorporated herein by reference in its entirety.

BACKGROUND

The present disclosure relates to an accelerator, a storage device, and a VR system.

Virtual Reality refers to an interface between a user and a device that creates a specific environment or situation using a computer and makes the user feel as if the user is interacting with a real environment and situation. In generating a VR image so as to implement virtual reality, a process of stitching together images captured in different directions is required. In this case, distortion may occur during the stitching process.

SUMMARY

Some embodiments of the present disclosure provide an accelerator and a storage device capable of dividing each of a plurality of original images into a stitching region and an image region, and then respectively performing different types of processing on the stitching region and the image region.

According to some embodiments of the present disclosure, there is provided an accelerator configured to generate a virtual reality (VR) image using a plurality of original images acquired from an input device. The accelerator includes a memory access module configured to acquire the plurality of original images for generating a VR image from a input device, and a computing module including a stitching region detector, a stitching processor, an image processor, and a combination processor. The memory access module may be configured to transmit the plurality of original images to the stitching region detector included in the computing module. The stitching region detector may be configured to detect at least one stitching region and an image region from each of the plurality of original images by performing detection processing on each of the plurality of original images received from the memory access module, to provide the at least one stitching region to the stitching processor, and to provide the image region to the image processor. The stitching processor may be configured to generate at least one post-processed stitching region by performing stitching processing on the at least one stitching region to provide the at least one post-processed stitching region to the combination processor. The image processor may be configured to generate at least one post-processed image region by performing image processing on the image region to provide the at least one post-processed image region to the combination processor. The combination processor may be configured to generate the VR image by performing combination processing on the at least one post-processed stitching region and the at least one post-processed image region.

According to some embodiments of the present disclosure, there is provided a storage device including a storage controller configured to acquire a plurality of original images from a host, an accelerator configured to detect at least one stitching region and an image region from each of the plurality of original images, to generate at least one post-processed stitching region by performing first processing on the at least one stitching region, to generate a post-processed image region by performing second processing on the image region, and to generate a virtual reality (VR) image by performing third processing on the post-processed stitching region and the post-processed image region, and a memory device configured to store the VR image.

According to some embodiments of the present disclosure, there is provided a VR system including a host, at least one camera configured to capture a plurality of original images for generating a VR image, and configured to provide the plurality of original images to the host, and a storage device comprising a storage controller, a memory device, and an accelerator. The storage controller may be configured to transmit, in response to a write request for the plurality of original images from the host, the plurality of original images to the accelerator. The accelerator may be configured to detect a stitching region and an image region from each of the plurality of original images, to generate the VR image by respectively performing different types of processing on the stitching region and the image region, and to transmit a write request for the VR image to the storage controller. The storage controller may be configured to transmit, in response to the write request of the accelerator, a write command for writing the VR image to the memory device.

According to example embodiments of the present disclosure, each of a plurality of original images provided from an external host may be divided into a stitching region and an image region, and then processing specialized for each of the stitching region and the image region may be applied, thereby improving stitching speed and a degree of distortion of a VR image.

In addition, when a degree of distortion of a VR image generated through combination processing exceeds a threshold value, a combination processor may generate the VR image with an improved degree of distortion by iteratively re-performing the combination processing.

The various and beneficial advantages and effects of the present disclosure are not limited to the above description, and will be more easily understood in the course of describing specific example embodiments of the present disclosure.

BRIEF DESCRIPTION OF DRAWINGS

The above and other aspects, features, and advantages of the present inventive concept will be more clearly understood from the following detailed description, taken in conjunction with the accompanying drawings, in which:

FIG. 14 is a flowchart illustrating an operation of a combination processor included in a VR system according to example embodiments of the present disclosure.

DETAILED DESCRIPTION

Hereinafter, preferred example embodiments of the present disclosure will be described with reference to the accompanying drawings.

Figure 1:
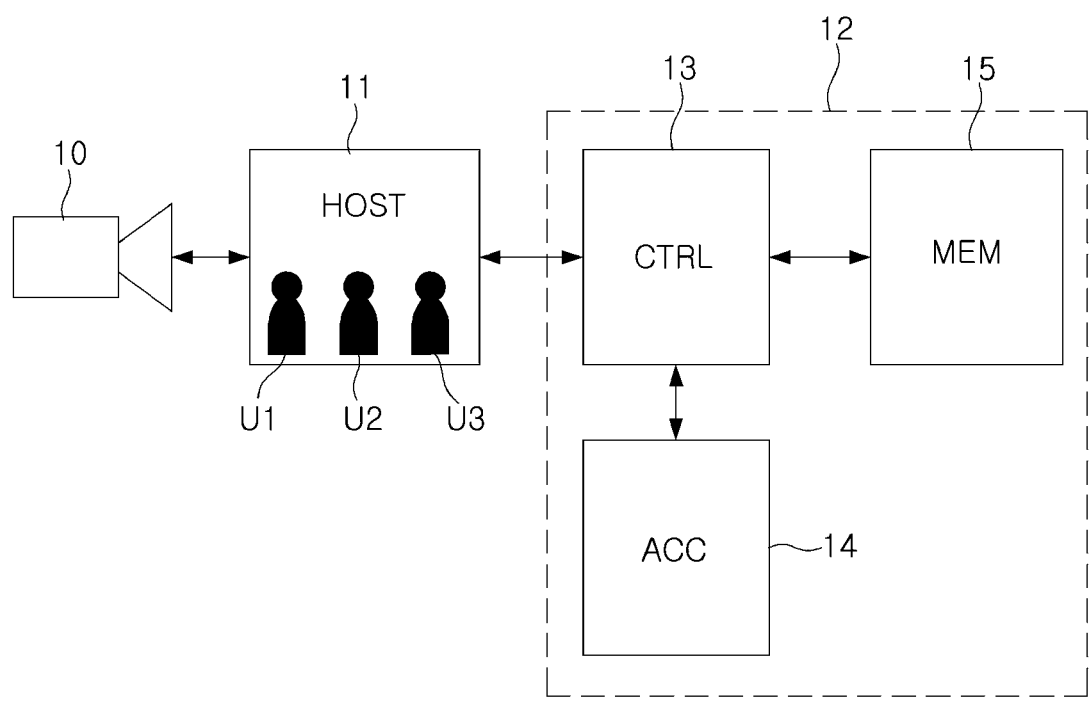
FIG. 1 is a diagram schematically illustrating a VR system according to example embodiments of the present disclosure.

FIG. 1 is a diagram schematically illustrating a VR system according to example embodiments of the present disclosure.

Figure 2:
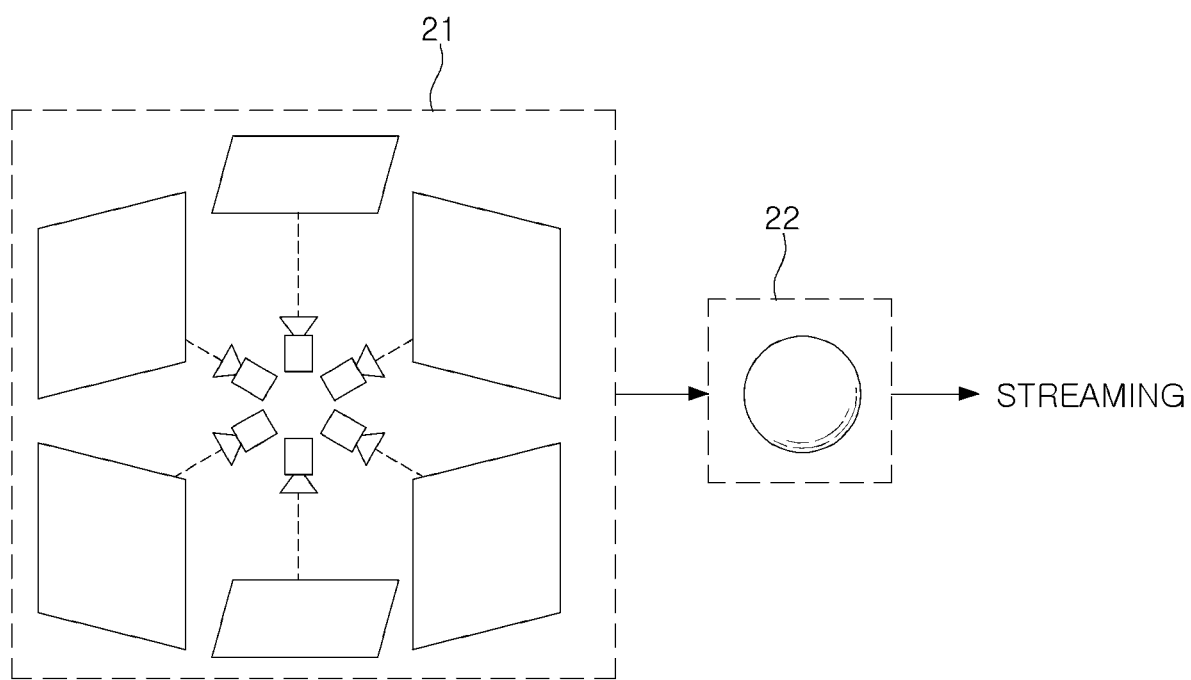
FIG. 2 is a diagram illustrating an operation of a VR system according to example embodiments of the present disclosure.

FIG. 2 is a diagram illustrating an operation of a VR system according to example embodiments of the present disclosure.

Referring to FIGS. 1 and 2, a VR system 1 according to example embodiments of the present disclosure may include an input device such as a camera 10, a host 11, and a storage device 12. The storage device 12 may include a storage controller 13, a memory device 15, and an accelerator 14. The camera 10 may generate a plurality of original images 21 by capturing a subject to generate a VR image. In order to generate different VR images in response to requests of users U1 to U3, the camera 10 may provide, to the host 11, a plurality of different original images 21 captured in different directions.

The host 11 may transmit a write request to the storage controller 13 with respect to the plurality of acquired original images 21. The storage controller 13 may transmit, in response to the write request of the host 11 for the plurality of original images 21, the plurality of original images 21 to the accelerator 14. The accelerator 14 may generate a VR image 22 using the plurality of original images 21 acquired from the storage controller 13.

The accelerator 14 may generate a VR image 22 by performing different types of processing on a stitching region and an image region, and then combining the stitching region and the image region. The accelerator 14 may generate the VR image 22, and then may transmit the VR image 22 to the memory device 15, and store the VR image 22 in the memory device 15. The VR image 22 stored in the memory device 15 may be output to the host 11 in response to the requests of the users U1 to U3, and the output VR image 22 may be streamed to the users U1 to U3.

A process of stitching the plurality of images 21 provided from the host 11 may be necessary to generate the VR image 22. In this case, the number of pixels and/or pixel information of the plurality of images 21 may be distorted or omitted during the stitching process. According to example embodiments of the present disclosure, each of the plurality of images 21 provided from the host 11 may be divided into a stitching region and an image region, and then processing specialized for each of the stitching region and the image region may be applied, thereby improving stitching speed and reducing the degree of distortion.

Figure 3:
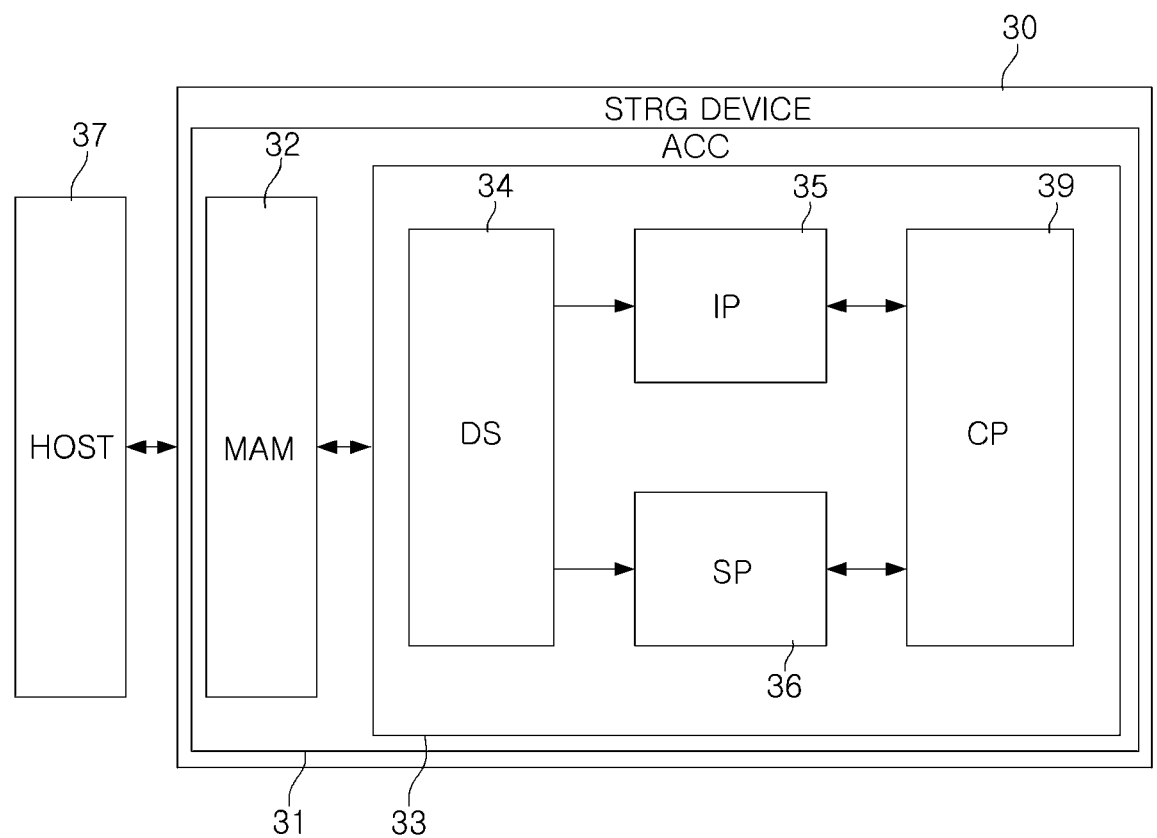
FIG. 3 is a diagram specifically illustrating an accelerator included in a VR system according to example embodiments of the present disclosure.

FIG. 3 is a diagram specifically illustrating an accelerator included in a VR system according to example embodiments of the present disclosure. The accelerator of FIG. 3 may correspond to the accelerator 14 of FIG. 1.

Figure 4:
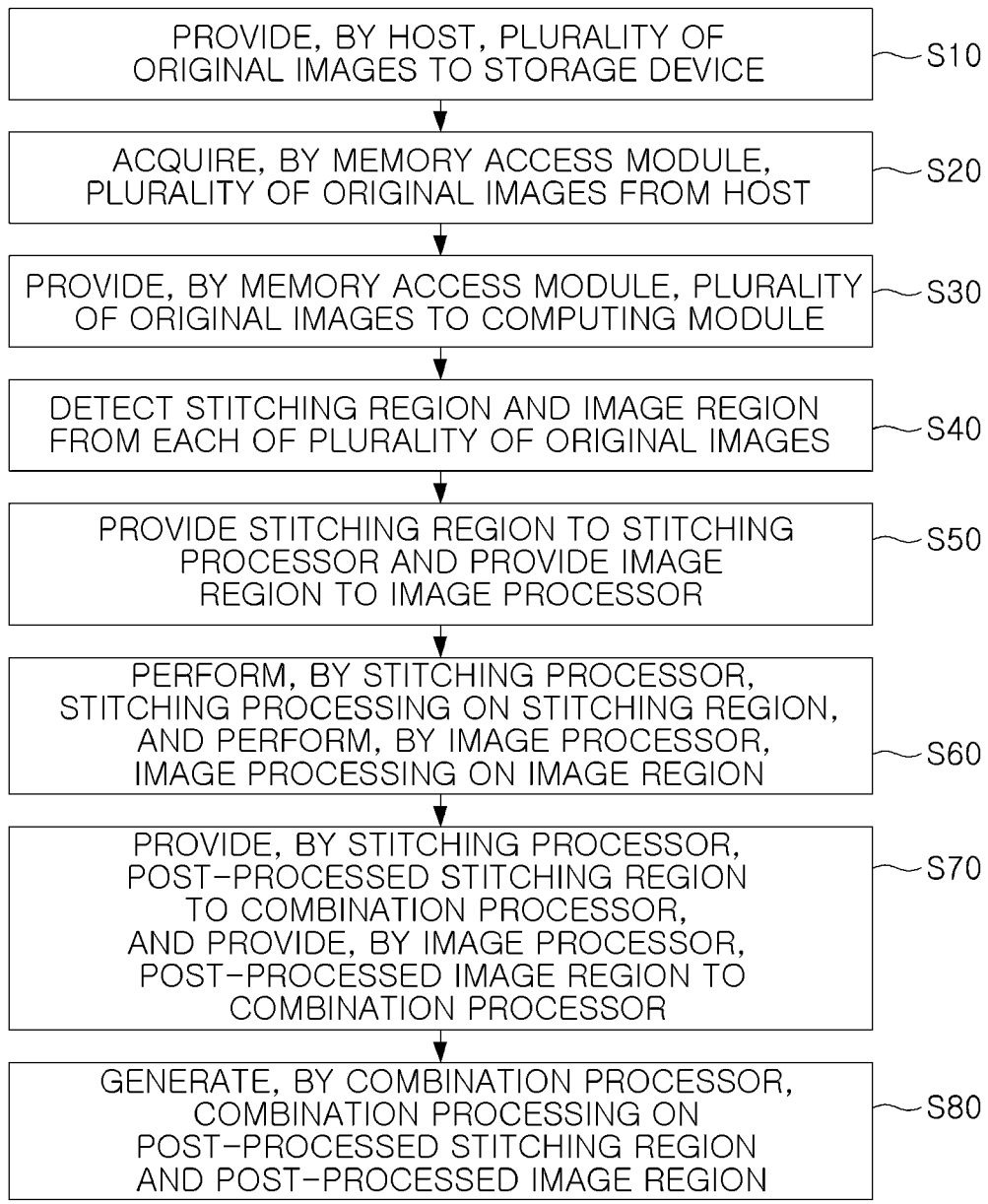
FIG. 4 is a flowchart illustrating an operation of a VR system according to example embodiments of the present disclosure.

FIG. 4 is a flowchart illustrating an operation of a VR system according to example embodiments of the present disclosure.

Referring to FIGS. 3 and 4, a VR system 2 according to example embodiments of the present disclosure may include a host 37 and a storage device 30, and the storage device 30 may include an accelerator 31. The accelerator 31 may include a memory access module 32 and a computing module 33. As described with reference to FIG. 1, the storage device 30 may include a memory controller and a memory device. However, in FIG. 3, the memory controller and the memory device may be omitted.

The computing module 33 may include a stitching region detector 34, an image processor 35, a stitching processor 36, and a combination processor 39.

The computing module 33 may generate a VR image by processing a plurality of original images provided from the memory access module 32 in a stepwise manner. The memory access module 32 may directly or indirectly obtain the original images from camera 10. The VR image generated by the computing module 33 may be stored in the memory device, and the VR image stored in the memory device may be provided and streamed to the host 37 in response to a request of the host 37.

In operation S10, the host 37 may provide a plurality of original images to the storage device 30. In operation S20, the memory access module 32 included in the accelerator 31 of the storage device 30 may acquire the plurality of original images from the host 37. In operation S30, the memory access module 32 may provide, to the computing module 33, the plurality of original images acquired from the host 37.

The stitching region detector 34 may receive the plurality of original images from the memory access module 32. In operation S40, the stitching region detector 34 may detect at least one stitching region and an image region from the plurality of received original images.

In operation S50, the stitching region detector 34 may transmit the at least one stitching region to the stitching processor 36, and may transmit the image region to the image processor 35. In operation S60, the stitching processor 36 may stitch the at least one stitching region to generate at least one post-processed stitching region, and the image processor 35 may perform image processing on at least one image region to generate a post-processed image region. An operation of generating, by the stitching processor 36, the post-processed stitching region and an operation of generating, by the image processor 35, the post-processed image region may be performed in parallel.

In operation S70, the stitching processor 36 may provide the at least one post-processed stitching region to the combination processor 39, and the image processor 35 may provide the post-processed image region to the combination processor 39. In operation S80, the combination processor 39 may generate a VR image by performing combination processing on the at least one post-processed stitching region and the post-processed image region.

The combination processor 39 may calculate an error rate by comparing information of the VR image with information of the plurality of original images provided from the host 37. The host 37 may set an threshold value for the error rate in the combination processor 39, and the combination processor 39 may compare the error rate between information of the VR image and the information of the plurality of original images with the threshold value for the error rate.

When the error rate exceeds the threshold value, the combination processor 39 may re-perform the combination processing on the post-processed stitching region and the post-processed image region. The re-performing of the combination processing may be performed iteratively until the error rate is less than the threshold value. The combination processor 39 may refer to the threshold value when re-performing the combination processing. The threshold value may be provided from a host. For example, when the combination processor 39 calculates an error rate based on the number of pixels included in the information of the VR image and the number of pixels included in the information of the plurality of original images, the host 37 may set a threshold value for the error rate between the numbers of pixels to 10% in the combination processor 39. As another example, the error rate may be a percentage of the difference in the total number of pixels of the plurality of original images and the number of pixels of the VR image out of the total number of pixels of the plurality of original images.

In this case, when the error rate between the number of pixels included in the information of the VR image and the number of pixels included in the information of the plurality of original images exceeds 10%, the combination processor 39 may re-perform the combination processing on the post-processed stitching region and the post-processed image region, and may re-generate the VR image such that the error rate does not exceed 10%.

Conversely, when the error rate between the number of pixels included in the information of the VR image and the number of pixels included in the information of the plurality of original images does not exceed 10%, the generated VR image may be stored in the memory device. In this case, the accelerator 31 may transmit a write request for the VR image to a storage controller, and the storage controller may transmit, in response to the write request for the VR image of the accelerator 31, a write command for the VR image to the memory device.

The host 37 may make a read request to the storage device 30 so as to stream the VR image stored in the memory device as a VR video. The storage controller may transmit, in response to the read request of the host, a read command for the VR image to the memory device, and may acquire the VR image from the memory device. The storage controller may transmit the VR image acquired from the memory device to the host 37 to provide the VR video.

Hereinafter, a method of generating a VR image from a plurality of original images according to example embodiments of the present disclosure will be described in more detail with reference to FIGS. 5 to 10.

Figure 5:
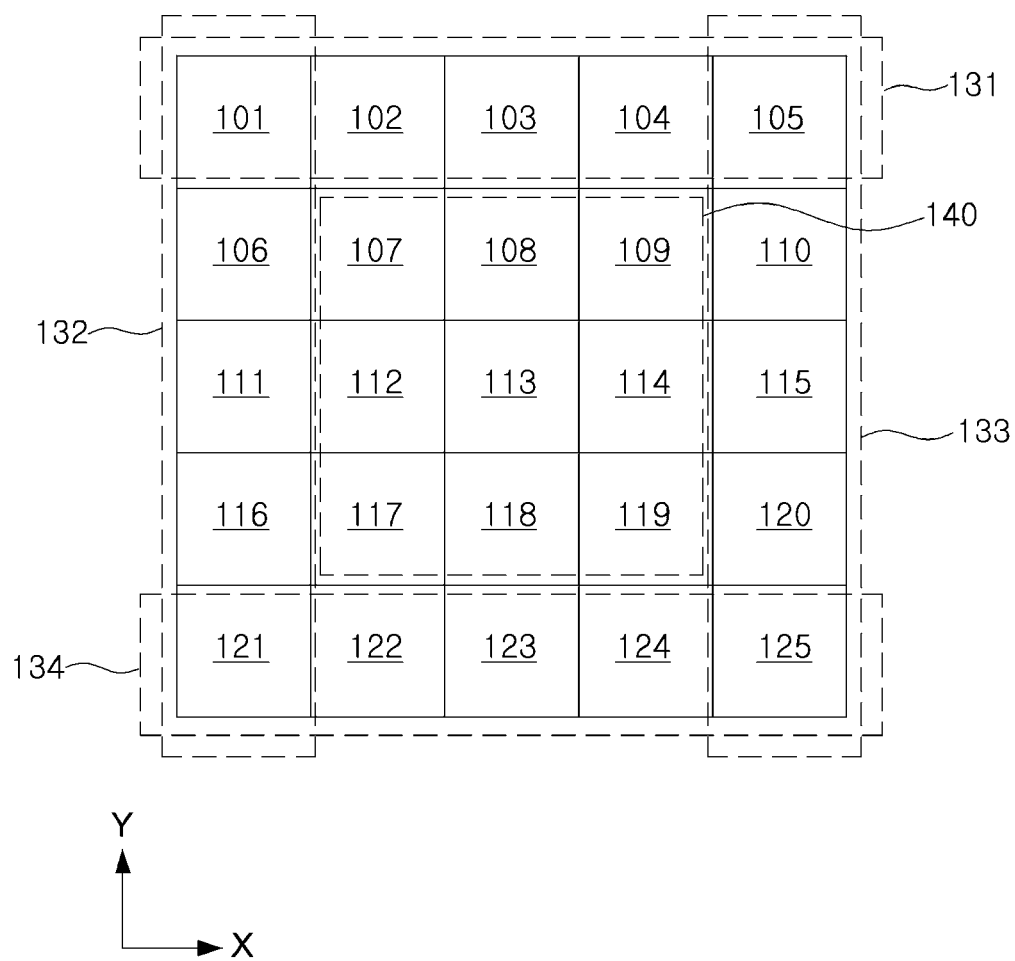
FIG. 5 is a diagram schematically illustrating one of a plurality of original images included in a VR system according to example embodiments of the present disclosure.

FIG. 5 is a diagram schematically illustrating one of a plurality of original images included in a VR system according to example embodiments of the present disclosure.

Referring to FIG. 5, one original image 100 among a plurality of original images is provided by a memory access module from a host and transmitted by the memory access module to a stitching region detector. The one original image 100 may be a rectangular image, and may include first to twenty-fifth pixels 101 to 125. Hereinafter, for ease of description, it is assumed that the original image 100 may include the first to twenty-fifth pixels 101 to 125, but the present disclosure is not limited thereto. The number of pixels that the original image 100 may include may vary according to example embodiments.

The stitching region detector may linearly read data of the original image 100. That is, the original image 100 may have a plurality of pixels in a first direction X and a second direction Y. However, data of the plurality of pixels of the original image 100 may be linearly treated, i.e., in either the first direction X or the second direction Y.

The stitching region detector may identify, based on the linearly read data, a starting point and an ending point of the data of the original image 100. In other words, the stitching region detector may read the first to twenty-fifth pixels 101 to 125 in an order in which the first to twenty-fifth pixels 101 to 125 are received from the memory access module. The stitching region detector may identify that the first pixel 101 is a point at which the data of the original image 100 starts, and may identify that the twenty-fifth pixel 125 is a point at which the data of the original image 100 ends.

Referring to FIG. 5, consecutive first to fifth pixels 101 to 105 in the data of the original image 100 may be adjacent to each other in the first direction X in the original image 100, such that a data difference therebetween may be relatively small. The stitching region detector may start reading data of a first pixel at which the data of the original image 100 starts, and may detect, based on the relatively small data difference between the first to fifth pixels 101 to 105, a first edge region 131 that includes the first to fifth pixels 101 to 105.

Conversely, the fifth pixel 105 and the sixth pixel 106, which are treated as consecutive pixels on the data of the original image 100, may not be adjacent to each other on the original image 100, and may be far apart from each other in the first direction X. Thus, a difference between a data value of the fifth pixel 105 and a data value of the sixth pixel 106 may be relatively large. The stitching region detector may detect a relatively large difference among a difference between data of the fifth pixel 105 and data of the sixth pixel 106, a difference between data of the tenth pixel 110 and data of the eleventh pixel 111, a difference between data of the fifteenth pixel 115 and data of the sixteenth pixel 116, and a difference between data of the twentieth pixel 120 and data of the twenty-first pixel 121, and may detect, based on the detected data difference, a second edge region 132 and a third edge region 133.

The stitching region detector may read the data of the twenty-first to twenty-fifth pixels 121-125 in order, and then may detect a fourth edge region 134 including the twenty-first to twenty-fifth pixels 121 to 125. An operation of searching for, by the stitching region detector, the fourth edge region 134 may be understood by referring to the above-described process of searching for, by the stitching region detector, the first edge region 131.

As illustrated in FIG. 5, when the original image 100 is a rectangular image, at least one edge region that the original image 100 may include may be a maximum of four, and may be the first to fourth edge regions 131 to 134, and the first to fourth edge regions 131 to 134 may share a partial region with each other. A shape of the original image 100 may vary according to example embodiments of the disclosure, and thus the number of edge regions that the original image includes may also vary according to example embodiments.

The stitching region detector may detect one or more edge regions 131 to 134 in the original image 100, and then may compare the one or more edge regions 131 to 134 with other edge regions of other original images to detect the one or more edge regions 131 to 134 as a stitching region to be stitched. Each of the one or more edge regions 131 to 134 may be stitched with any one of the other edge regions. As a result, the one or more edge regions 131 to 134 may be detected as the stitching region. The stitching region detector may detect a remaining region except the stitching region in the original image 100, as an image region 140.

Figure 6:
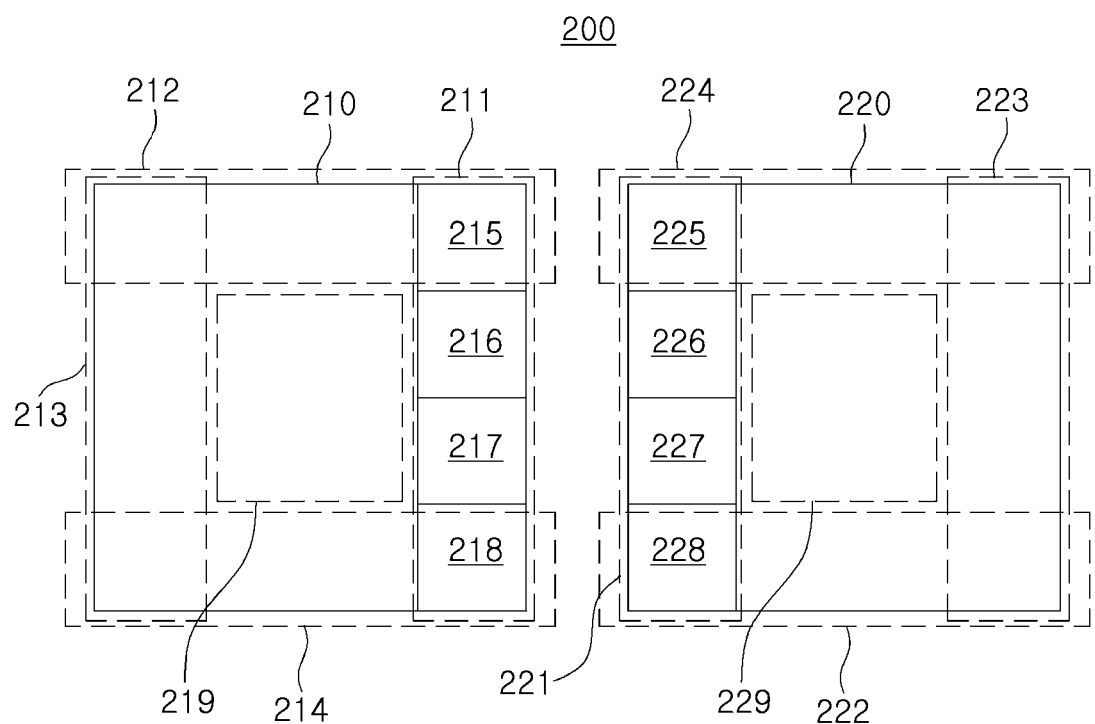
FIG. 6 is a diagram illustrating an operation of a stitching region detector included in a VR system according to example embodiments of the present disclosure.

FIG. 6 is a diagram illustrating an operation of a stitching region detector included in a VR system according to example embodiments of the present disclosure.

Referring to FIG. 6, the stitching region detector 200 may perform detection processing to detect a stitching region from an original image 210 and a second original image 220 included in a plurality of original images provided from a memory access module. That is, there may be regions overlapping each other in the first original image 210 and the second original image 220 captured in different directions to generate one VR image. In order to generate a VR image by splicing the overlapping regions together, overlapping regions may be searched among edge regions of the first original image 210 and the second original image 220, and the overlapping regions may be referred to as a stitching region.

The stitching region detector 200 may search for one or more edge regions 211 to 214 in the first original image 210, and may search for one or more edge regions 221 to 224 in the second original image 220.

The stitching region detector 200 may compare data of an arbitrary first edge region 211 included in the one or more edge regions 211 to 214 of the first original image 210 with data of an arbitrary second edge region 221 included in the one or more edge regions 221 to 224 of the second original image 220. The stitching region detector 200 may determine whether to detect, as the stitching region, the first edge region 211 and the second edge region 221, using a result of comparing information of the first edge region 211 with information of the second edge region 221.

The first edge region 211 of the first original image 210 may include a plurality of pixels 215 to 218, and the second edge region 221 of the second original image 220 may include a plurality of pixels 225 to 228. Hereinafter, for ease of description, it is assumed that the first edge region 211 and the second edge region 221 respectively include four pixels, but the present disclosure is not limited thereto, and the number of pixels that an edge region included in an original image may vary.

In order to detect whether the first edge region 211 and the second edge region 221 are stitched regions, the stitching region detector 200 may compare information of each of a plurality of pixels 215 to 218 included in the first edge region 211 with information of each of a plurality of pixels 225 to 228 included in the second edge region 221.

For example, the stitching region detector 200 may compare color information of a first pixel 215 of the first edge region 211 with color information of a first pixel 225 of the second edge region 221, compare color information of a second pixel 216 of the first edge region 211 with color information of a second pixel 226 of the second edge region 221, compare color information of a third pixel 217 of the first edge region 211 with color information of a third pixel 227 of the second edge region 221, and/or compare color information of a fourth pixel 218 of the first edge region 211 with color information of a fourth pixel 228 of the second edge region 221.

The stitching region detector 200 may calculate a similarity between information of the plurality of pixels 215 to 218 included in the first edge region 211 and information of the plurality of pixels 225 to 228 included in the second edge region 221. When the similarity exceeds a preset range, the stitching region detector 200 may detect the first edge region 211 and the second edge region 221 as stitching regions that need to be stitched with each other. Conversely, when the similarity is less than or equal to the preset range, the first edge region 211 and the second edge region 221 may not be stitched together.

The stitching region detector 200 may detect stitching regions to be stitched with each other by applying detection processing performed on the first edge region 211 of the first original image 210 and the first edge region 221 of the second original image 220 in the same manner with respect to the second to fourth edge regions 212 to 214 of the first original image 210, the second to fourth edge regions 222 to 224 of the second original image 220, and edge regions of other original images included in a VR image together with the first original image 210 and the second original image 220.

The stitching region detector 200 may detect, as an image region 219, a remaining region excluding regions detected as stitching regions from the first original image 210, and may detect, as an image region 229, a remaining region excluding stitching regions detected as stitching regions from the second original image 220.

The stitching region detector 200 may transmit, to a stitching processor, stitching regions 211 to 214 and 221 to 224 detected as a result of the detection processing, and may transmit, to an image processor, image regions 219 and 229 detected as a result of the detection processing.

The stitching processor receiving the stitching regions 211 to 214 and 221 to 224 may perform stitching processing on the stitching regions 211 to 214 and 221 to 224 to generate a post-processed stitching region. The stitching processing may be different from image processing performed by the image processor. For example, the stitching processing may use an algorithm optimized to minimize a degree of distortion that may occur during a stitching process.

For example, unlike the image processing, the stitching processing may calculate an average value of the information of the first edge region 211 and the information of the second edge region 221 detected as the stitching regions, and may stitch the first edge region 211 and the second edge region 221 to generate a post-processed stitching region having information of the average value.

The stitching processing performed by the stitching processor may be performed in parallel with the image processing performed by the image processor. In other words, while the stitching processing is performed by the stitching processor, the image processing may be performed by the image processor.

The stitching processor may perform the stitching processing optimized for a stitching region, and the image processor may perform the image processing optimized for an image region, thereby improving generation speed of the VR image and a degree of distortion of the VR image.

Figure 7:
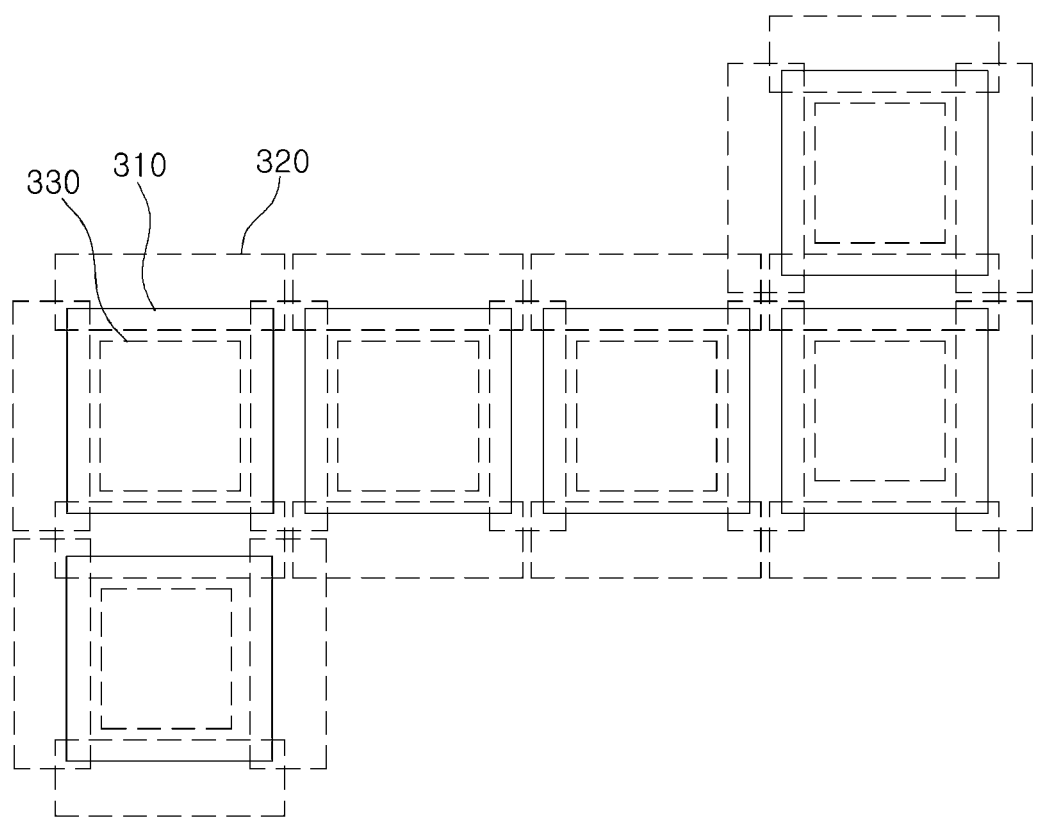
FIG. 7 is a diagram illustrating an operation of a VR system according to example embodiments of the present disclosure.

FIG. 7 is a diagram illustrating an operation of a VR system according to example embodiments of the present disclosure.

Referring to FIG. 7, a VR system according to example embodiments of the present disclosure may receive, from a host, a plurality of original images 310 for generating a VR image. The plurality of original images 310 illustrated in FIG. 7 may all have the same size. In some example embodiments, at least some of the original images provided by the host may be different from each other.

The VR system may generate a VR image as an omnidirectional image for mapping to a spherical virtual model, using the plurality of original images 310. For example, the omnidirectional image may be an image for hexahedral mapping. In order to generate the omnidirectional image, one or more cameras may capture an image in different directions forming a 90-degree angle, thereby generating the plurality of original images 310.

A stitching region detector may perform detection processing for detecting a plurality of stitching regions 320 and a plurality of image regions 330 from the plurality of original images 310. The plurality of stitching regions 320 may be provided to the stitching processor, and the plurality of image regions 330 may be provided to an image processor.

Figure 8:
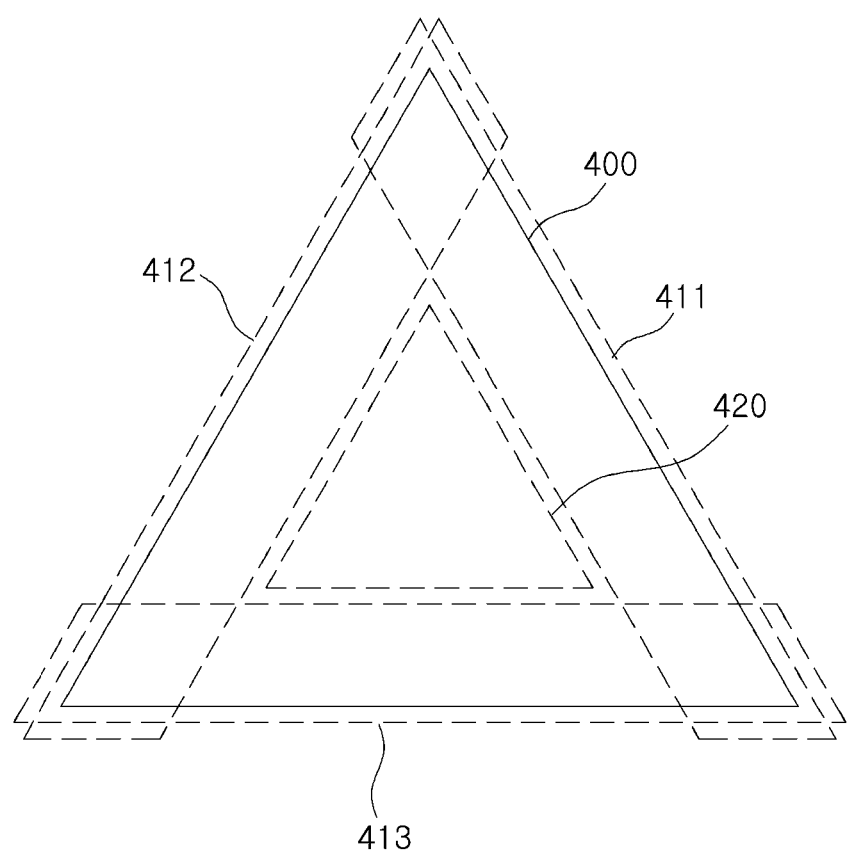
FIG. 8 is a diagram schematically illustrating one of a plurality of original images included in a VR system according to example embodiments of the present disclosure.

FIG. 8 is a diagram schematically illustrating one of a plurality of original images included in a VR system according to example embodiments of the present disclosure.

Referring to FIG. 8, one original image 400 among a plurality of original images provided by a memory access module from a host, and transmitted by the memory access module to a stitching region detector may be a triangular image, and at least one edge region that the original image 400 may include may be a maximum of three, and may be first to third edge regions 411 to 413. The first to third edge regions 411 to 413 may share a partial region with each other.

The stitching region detector may linearly read data of the original image 400. That is, even when the original image 400 is a triangular image, data of pixels of the original image 400 may be linearly treated. An operation of reading the data of the original image 400 and an operation of searching for the first to third edge regions 411 to 413 of the original image 400 may be understood with reference to the example embodiments described with reference to FIG. 5.

The stitching region detector may search for one or more edge regions 411 to 413 in the original image 400, and then may compare the one or more edge regions 411 to 413 with other edge regions of different original images to detect the one or more edge regions 411 to 413 as a stitching region, and may detect, as an image region 420, a remaining region excluding the stitching region.

Figure 9:
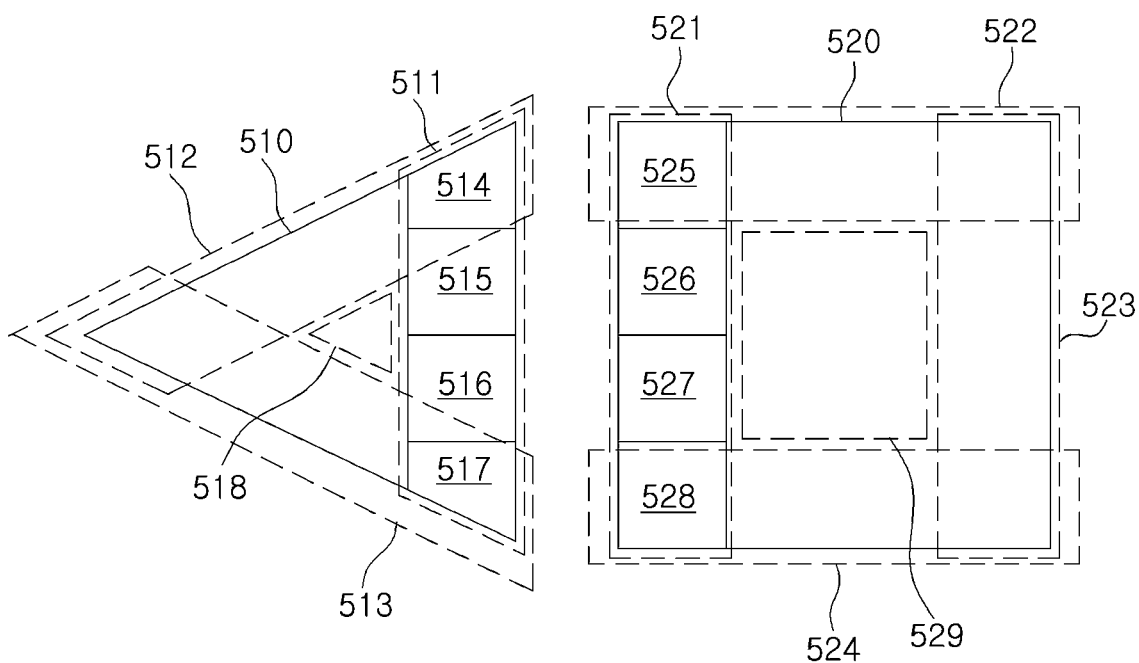
FIG. 9 is a diagram illustrating an operation of a stitching region detector included in a VR system according to example embodiments of the present disclosure.

FIG. 9 is a diagram illustrating an operation of a stitching region detector included in a VR system according to example embodiments of the present disclosure.

Referring to FIG. 9, in order to detect a stitching region from a first original image 510 and a second original image 520 included in a plurality of original images provided from a memory access module, a stitching region detector 500 may perform detection processing. The stitching region detector 500 may search for one or more edge regions 511 to 513 in the first original image 510, and may search for one or more edge regions 521 to 524 in the second original image 520.

The stitching region detector 500 may compare data of an arbitrary first edge region 511 included in the one or more edge regions 511 to 513 of the first original image 510 with data of an arbitrary second edge region 521 included in the one or more edge regions 521 to 524 of the second original image 520.

The stitching region detector 500 may determine whether to detect, as the stitching region, the first edge region 511 and the second edge region 521, using a result of comparing information of the first edge region 511 with information of the second edge region 521. First edge region 511 may include pixels 514 to 517 and the second edge region 521 may include pixels 525 to 528.

An operation of detecting, with the stitching region detector 500, a stitching region from the first and second original images 510 and 520 may be understood with reference to the example embodiments described above with reference to FIG. 6. The stitching region detector 500 may detect, as an image region 518, a remaining region excluding regions detected as stitching regions from the first original image 510, and may detect, as an image region 529, a remaining region excluding stitching regions detected as the stitching regions from the second original image 520.

The stitching region detector 500 may transmit, to a stitching processor, stitching regions 511 to 513 and 521 to 524 detected as a result of the detection processing, and may transmit, to an image processor, image regions 518 and 529 detected as a result of the detection processing.

Figure 10:
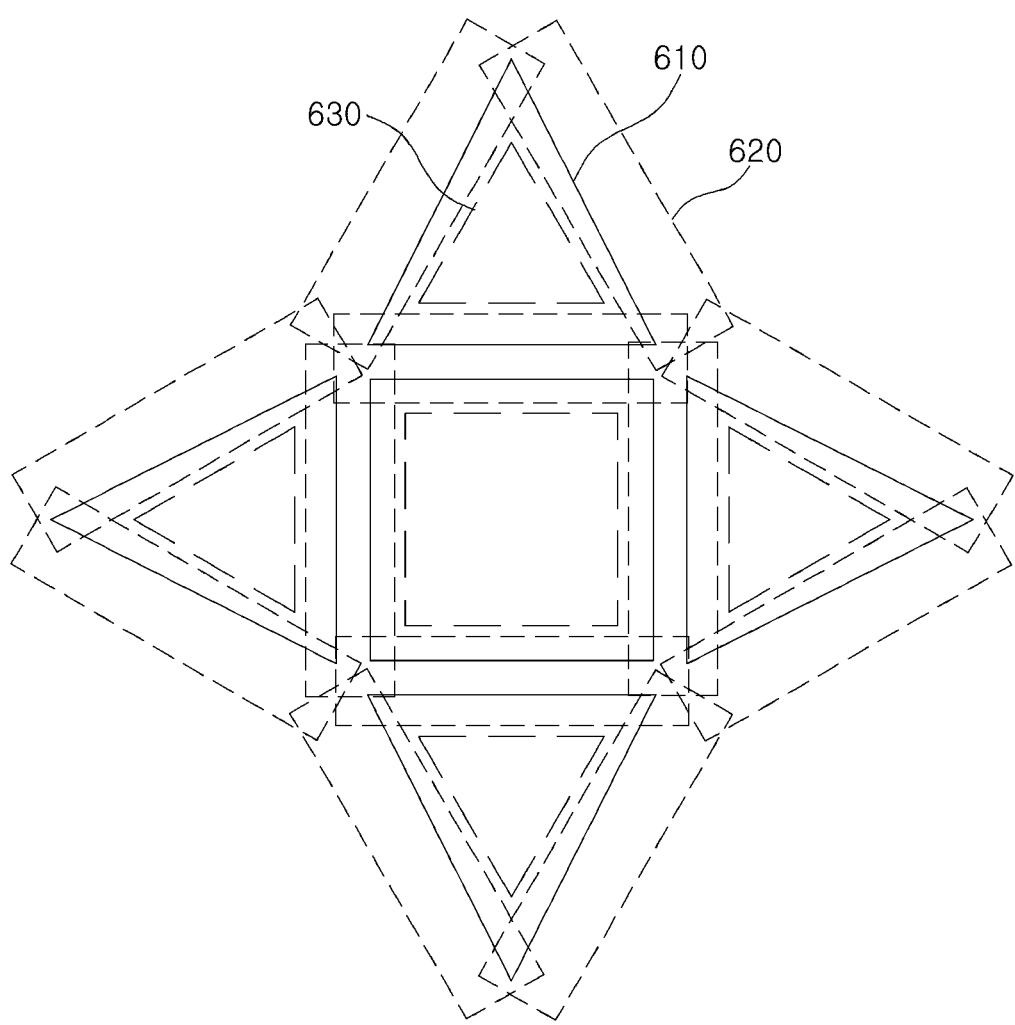
FIG. 10 is a diagram illustrating an operation of a VR system according to example embodiments of the present disclosure.

FIG. 10 is a diagram illustrating an operation of a VR system according to example embodiments of the present disclosure.

Referring to FIG. 10, a VR system according to example embodiments of the present disclosure may receive a plurality of images 610 for generating a VR image from a host.

The VR system may generate a VR image as an omnidirectional image for mapping to a spherical virtual model using the plurality of images 610. For example, the omnidirectional image may be an image for pyramidal pentahedral mapping. In order to generate the omnidirectional image, one or more cameras disposed at different angles may generate the plurality of original images 610 by capturing images in different directions.

A stitching region detector may perform detection processing to detect a plurality of stitching regions 620 and a plurality of image regions 630 from the plurality of original images 610. The plurality of stitching regions 620 may be provided to a stitching processor, and the plurality of image regions 630 may be provided to an image processor.

Figure 11:
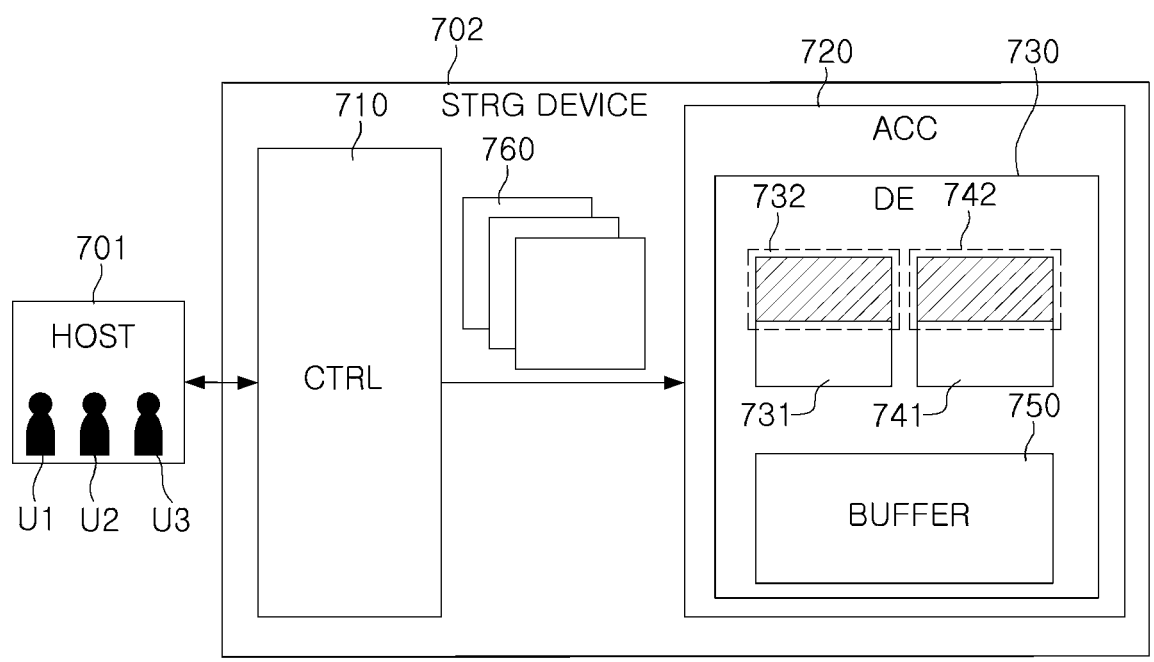
FIG. 11 is a diagram illustrating an operation of a VR system according to example embodiments of the present disclosure.

FIG. 11 is a diagram illustrating an operation of a VR system according to example embodiments of the present disclosure.

Referring to FIG. 11, a VR system according to example embodiments of the present disclosure may include a host 701 and a storage device 702. The storage device 702 may include a storage controller 710 and an accelerator 720. The accelerator 720 may include a stitching region detector 730, and the stitching region detector 730 may include a buffer 750.

As described with reference to FIG. 3, the stitching region detector 730 may be included in the accelerator 720. The stitching region detector 730 may perform detection processing on a first original image 731 and a second original image 741 provided from the storage controller 710. The stitching region detector 730 may linearly read data of the first and second original images 731 and 741, and may detect edge regions of the first and second original images 731 and 741 so as to detect stitching regions of the first and second original images 731 and 741.

While the stitching region detector 730 reads the data of the first and second original images 731 and 741 received from a user among users U1 to U3, the storage controller 710 may be provided, from another user on the host 701, a plurality of third original images 760 for generating a second VR image different from a first VR image to be generated using the first and second original images 731 and 741.

The storage controller 710 may provide the plurality of third original images 760 to the stitching region detector 730 searching for the edge regions of the first and second original images 731 and 741. In this case, the detection processing performed on the first and second original images 731 and 741 of the stitching region detector 730 may be interrupted. For example, the stitching region detector 730 may complete searching for an edge region only with respect to a partial region 732 of the first original image 731, and may complete searching for an edge region only with respect to a partial region 742 of the second original image 741.

When the detection processing performed on the first and second original images 731 and 741 is interrupted, the stitching region detector 730 may store, in a buffer, the data of the first and second original images that were read until the interruption occurred.

After the data of the first and second original images that were read until an interruption occurred is stored in the buffer, the stitching region detector 730 may perform the detection processing on the plurality of third original images 760 provided from the storage controller 710. The stitching region detector 730 completing the detection processing performed on the plurality of third original images 760 may retrieve the data of the first and second original images 731 and 741 stored in the buffer 750. Thereafter, the detection processing may be re-performed on the remaining unread regions of the first and second original images 731 and 741.

Figure 12:
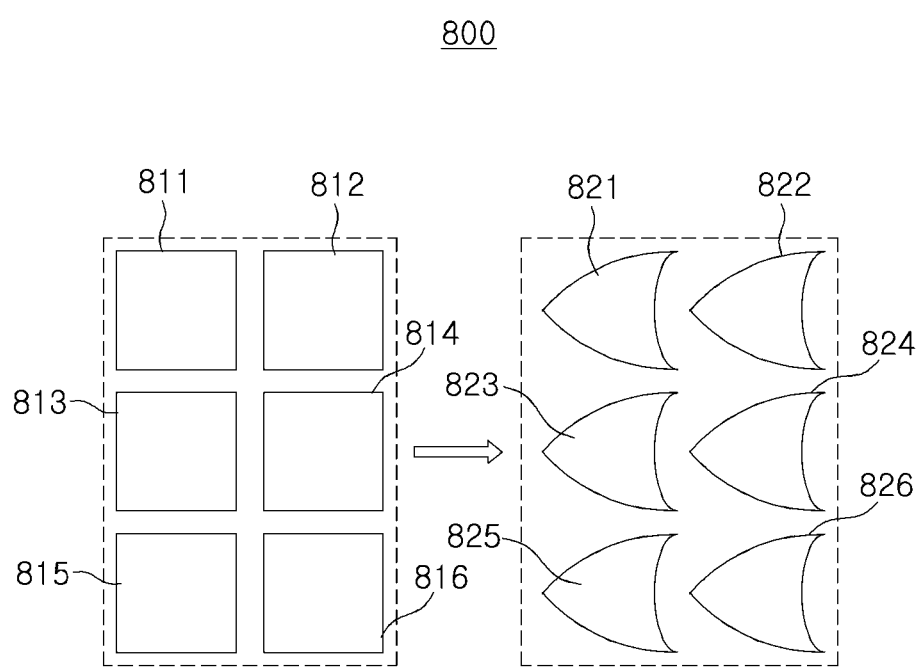
FIG. 12 is a diagram illustrating an operation of an image processor included in a VR system according to example embodiments of the present disclosure.

FIG. 12 is a diagram illustrating an operation of an image processor included in a VR system according to example embodiments of the present disclosure.

Referring to FIG. 12, an image processor 800 may receive one or more image regions 811 to 816 from a stitching region detector. The image processor 800 may generate post-processed image regions 821 to 826 by performing image processing on the one or more image regions 811 to 816 provided from the stitching region detector. The image processing may be a pre-operation for allowing a combination processor to generate a VR image. For example, the image processing may include operations such as 3D modeling, resizing, shearing, and/or color conversion.

Figure 13:
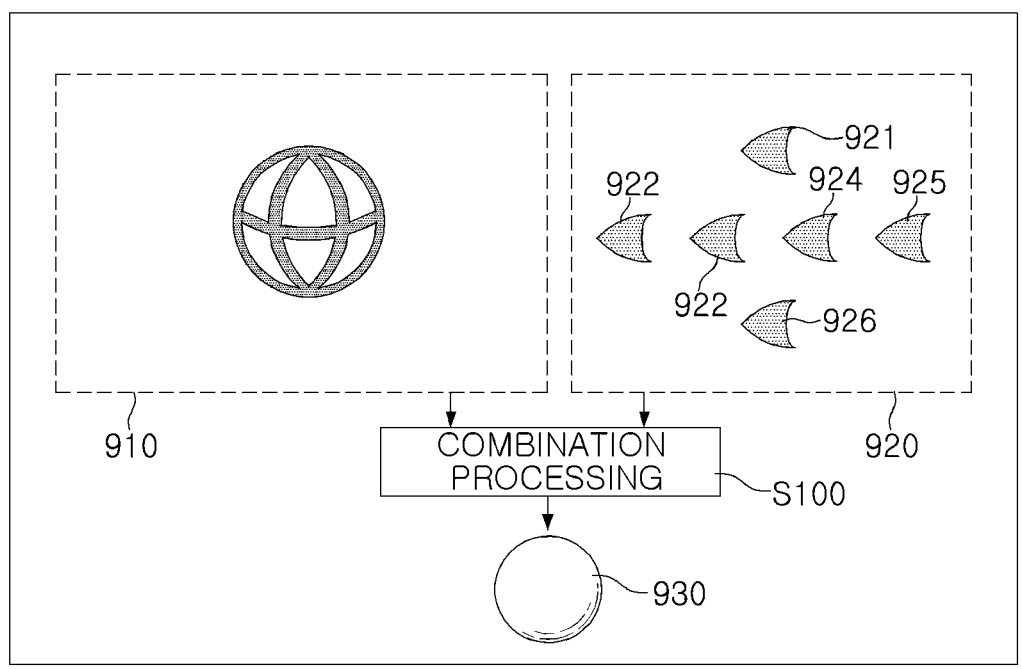
FIG. 13 is a diagram illustrating an operation of a combination processor included in a VR system according to example embodiments of the present disclosure.

FIG. 13 is a diagram illustrating an operation of a combination processor included in a VR system according to example embodiments of the present disclosure.

As described above with reference to FIG. 3, a combination processor 900 may receive at least one post-processed image region 920 from an image processor, and may receive a post-processed stitching region 910 from a stitching processor.

FIG. 13 illustrates that the combination processor receives six post-processed image regions 921 to 926 from the image processor. However, the number of post-processed image regions that the combination processor received to generate one VR image 930 may vary according to example embodiments.

In operation S100, the combination processor 900 may generate a VR image 930 by performing combination processing on at least one post-processing stitching region 910 and one or more post-processing image region 921 to 926. For example, the combination processing may include an operation of stitching the post-processing stitching region 910 and a plurality of post-processing image regions 920 together.

FIG. 14 is a flowchart illustrating an operation of a combination processor included in a VR system according to example embodiments of the present disclosure.

As described with reference to FIG. 13, in operation S110, a combination processor may generate a VR image by performing combination processing on a post-processed image region and a post-processed stitching region. In operation S120, the combination processor may calculate an error rate by comparing information of the generated VR image with information of a plurality of original images used to generate the VR image.

For example, the combination processor may compare the number of pixels included in the information of the VR image with the number of pixels included in the information of the plurality of original images. According to some embodiments, the combination processor may compare color information included in the information of the VR image with color information included in the information of the plurality of original images. However, the present disclosure is not necessarily limited thereto, and the information of the VR image and the information of the plurality of original images used when the combination processor calculates the error rate may vary.

After the error rate is calculated, the combination processor may compare the error rate with a preset threshold value in operation S130 to determine whether the error rate exceeds the threshold value. For example, the combination processor may compare the total number of pixels of the VR image with the total number of pixels of the plurality of original images and calculate a difference therebetween as the error rate, and the preset threshold value may be 10%.

When the error rate does not exceed the threshold value ("No" in operation S130), the combination processor may transmit, to a storage controller, a write request for the VR image so as to store the generated VR image in a memory device in operation S140. The storage controller receiving the write request for the VR image may transmit a write command for the VR image to the memory device, and store the VR image in the memory device.

When the error rate exceeds the threshold value ("YES" in operation S130), in operation S150, the combination processor may re-perform combination processing on the post-processed stitching region and the post-processed image region to regenerate the VR image. When the combination processing is re-performed, the combination processor may refer to the preset threshold value.

For example, when the error rate between the total number of pixels in a first-processed VR image and the total number of pixels in the plurality of original images is 20% and the preset threshold value is 10%, the combination processor may re-perform the combination processing such that the error rate between the total number of pixels in a VR image and the total number of pixels in the plurality of original images does not exceed 10%. Therefore, the combination processor may generate a second-processed VR image with a lower degree of distortion than the first-processed VR image having an error rate of 20%, thereby improving performance of a VR system.

In operation S160, the combination processor may transmit, to the storage controller, a write request for the regenerated VR image so as to store the regenerated VR image in the memory device. The storage controller may transmit, in response to the write request of the combination processor, a write command for the regenerated VR image to the memory device, and store the regenerated VR image in the memory device.

While example embodiments have been shown and described above, it will be apparent to those skilled in the art that modifications and variations could be made without departing from the scope of the present disclosure as defined by the appended claims.

What is claimed is:

1. An accelerator configured to generate a virtual reality (VR) image using a plurality of original images acquired from an input device, the accelerator comprising:
a memory configured to acquire the plurality of original images for generating the VR image from the input device; and
a computing module comprising a stitching region detector, a stitching processor, an image processor, and a combination processor,
wherein the memory is configured to transmit the plurality of original images to the stitching region detector,
wherein the stitching region detector is configured to detect at least one stitching region and an image region from each of the plurality of original images by performing detection processing on each of the plurality of original images received from the memory,
wherein the stitching region detector is configured to provide the at least one stitching region to the stitching processor and to provide the image region to the image processor,
wherein the stitching processor is configured to generate at least one post-processed stitching region by performing stitching processing on the at least one stitching region to provide the at least one post-processed stitching region to the combination processor,
wherein the image processor is configured to generate at least one post-processed image region by performing image processing on the image region to provide the at least one post-processed image region to the combination processor, and
wherein the combination processor is configured to generate the VR image by performing combination processing on the at least one post-processed stitching region and the at least one post-processed image region.

2. The accelerator of claim 1, wherein the combination processor is configured to perform operations comprising:
calculating an error rate between information of the VR image and information of the plurality of original images; and
when the error rate exceeds a threshold value, re-performing the combination processing iteratively until the error rate between the information of the VR image and the information of the plurality of original images does not exceed the threshold value.

3. The accelerator of claim 2,
wherein the information of the VR image comprises a number of pixels of the VR image,
wherein the information of the plurality of original images comprises an average number of pixels of the plurality of original images, and
wherein the error rate comprises a percentage of difference in a total number of pixels of the plurality of original images and the number of pixels of the VR image, out of the total number of pixels of the plurality of original images.

4. The accelerator of claim 2,
wherein the information of the VR image comprises color information of the VR image, and wherein the information of the plurality of original images comprises color information of the plurality of original images.

5. The accelerator of claim 1, wherein the detection processing comprises operations comprising:
searching for one or more edge regions by reading data of each of the plurality of original images;
detecting the at least one stitching region based on edge regions overlapping each other by comparing the one or more edge regions of the plurality of original images with each other; and
detecting the image region based on a region excluding the at least one stitching region from each of the plurality of original images.

6. The accelerator of claim 5, wherein the searching for the one or more edge regions of each of the plurality of original images comprises:
linearly reading a plurality of pixels included in each of the plurality of original images; and
comparing data of the plurality of pixels with each other.

7. The accelerator of claim 5,
wherein the plurality of original images comprise a first original image and a second original image, and
wherein the detecting the at least one stitching region comprises identifying a stitching region of the first original image and a stitching region of the second original image based on edge regions having a similarity greater than or equal to a threshold value by comparing data of one or more edge regions of the first original image with data of one or more edge regions of the second original image.

8. The accelerator of claim 1, wherein the stitching region detector comprises a buffer configured to store the at least one post-processed stitching region.

9. The accelerator of claim 5,
wherein the stitching region detector comprises a buffer,
wherein the plurality of original images comprise a first image and a second image used for generating a first VR image, and a third image and a fourth image used for generating a second VR image,
wherein, if the stitching region detector receives the third image and the fourth image while the stitching region detector performs detection processing on stitching regions of the first image and the second image, the detection processing is interrupted, and
wherein the stitching region detector is configured to store, in the buffer, data of the first image and the second image of the plurality of original images when the detection processing is interrupted.

10. The accelerator of claim 1, wherein the stitching processor is configured to perform operations comprising:
calculating an average value of information of the at least one stitching region; and
performing stitching such that the at least one post-processed stitching region has information of the average value.

11. The accelerator of claim 1, wherein the stitching processing and the image processing are performed in parallel.

12. A storage device comprising:
a storage controller configured to acquire a plurality of original images from a host;
an accelerator configured to detect at least one stitching region and an image region from each of the plurality of original images to generate at least one post-processed stitching region by performing first processing on the at least one stitching region, to generate a post-processed image region by performing second processing on the image region, to generate a virtual reality (VR) image by performing third processing on the at least one post-processed stitching region and the post-processed image region, to calculate an error rate between data of the VR image and data of the plurality of original images, and re-performing the third processing when the error rate exceeds a threshold value; and a memory device configured to store the VR image.

13. The storage device of claim 12,
wherein the first processing and the second processing use different algorithms from one another and are performed in parallel with each other,
wherein the first processing comprises a stitching operation, and
wherein the second processing comprises a 3D modeling operation and/or a resizing operation.

14. The storage device of claim 12, wherein the accelerator is configured to transmit a write request for the VR image to the storage controller, when the error rate does not exceed the threshold value.

15. The storage device of claim 12,
wherein data of the VR image comprises at least one of a number of pixels of the VR image or color information of the VR image, and
wherein data of the plurality of original images comprises at least one of a number of pixels of at least one of the plurality of original images or color information of the at least one of the plurality of original images.

16. A virtual reality (VR) system comprising:
a host;
at least one camera configured to capture a plurality of original images for generating a VR image and configured to provide the plurality of original images to the host; and
a storage device comprising a storage controller, a memory device, and an accelerator,
wherein the storage controller is configured to transmit, in response to a write request for the plurality of original images from the host, the plurality of original images to the accelerator,
wherein the accelerator is configured to detect a stitching region and an image region from each of the plurality of original images, to generate the VR image by respectively performing different types of processing on the stitching region and the image region, and to transmit a write request for the VR image to the storage controller, and
wherein the storage controller is configured to transmit, in response to the write request of the accelerator, a write command for writing the VR image to the memory device.

17. The VR system of claim 16, wherein at least two of the plurality of original images captured by the at least one camera have different sizes.

18. The VR system of claim 16, wherein the VR image is generated by first to sixth images for generating an omnidirectional image of a cube.

19. The VR system of claim 16, wherein the VR image is generated by first to fifth images for generating a pyramidal omnidirectional image.

* * * * *